United States Patent
Waldmann

[11] Patent Number: 6,104,024
[45] Date of Patent: Aug. 15, 2000

[54] HOUSING, PREFERABLY EXTERNAL REARVIEW MIRROR FOR VEHICLES ESPECIALLY MOTOR VEHICLES

[75] Inventor: Bernd Waldmann, Nuertingen, Germany

[73] Assignee: Reitter & Schefanacker GmbH & Co., KG

[21] Appl. No.: 09/021,789

[22] Filed: Feb. 11, 1998

[30] Foreign Application Priority Data

Feb. 11, 1997 [DE] Germany .................. 197 05 131

[51] Int. Cl.⁷ .................................................. H01J 5/02
[52] U.S. Cl. ................ 250/239; 250/216; 359/513
[58] Field of Search .................. 250/239, 216, 250/551; 359/507, 511, 512, 513

[56] References Cited

U.S. PATENT DOCUMENTS 5,541,891  7/1996  Waldmann et al. .................. 367/99

*Primary Examiner*—Edward P. Westin
*Assistant Examiner*—Kevin Pyo
*Attorney, Agent, or Firm*—Robert W. Becker & Associates

[57] ABSTRACT

A housing is provided that has a receiving body for at least one optical sensing device and at least one hollow and air-tight window body for allowing passage of signals to and from the sensing device. The hollow and air-tight window body eliminates condensation on the window through which the signals of the sensing device have to pass and thus improves operation of the sensing device.

9 Claims, 2 Drawing Sheets

HOUSING, PREFERABLY EXTERNAL REARVIEW MIRROR FOR VEHICLES ESPECIALLY MOTOR VEHICLES

BACKGROUND OF THE INVENTION

The present invention relates to a housing, preferably an exterior rearview mirror for vehicles, especially motor vehicles, in which at least one optical sensing device is positioned and which has at least one window for emitting and/or receiving signals by the optical sensing device.

It is known to position within the exterior rearview mirror of a motor vehicle an optical sensing device with which, for example, lateral road surface areas are detected in a contact-free manner and which comprise a computing or evaluation device. Such sensing devices can also be used for obstacle recognition, distance measuring, monitoring the area to the rear of the vehicle etc. The beams emitted by the sensing device exit through a window from the housing to the exterior. Also, the beams will be received through the window by the sensing device in the interior. It has been found that such windows will steam up so that the function of the sensing device is impeded and, under certain circumstances, the sensing device will not function at all.

It is therefore an object of the present invention to embody a housing of the aforementioned kind such that a safe and secure functioning of the optical sensing device is ensured.

SUMMARY OF THE INVENTION

The housing according to the present invention comprises a receiving body for at least one optical sensing device and at least one hollow and air-tight window body for allowing passage of signals to and from the sensing device.

Preferably, the receiving body has a wall member with a receiving opening and the window body is sealingly mounted in the receiving opening.

Preferably, the window body has an outer wall and the wall member and the outer wall together form a continuous outer surface.

Preferably, the window body has a body member, including the outer wall, and an inner wall connected air-tightly to the body member.

The body member and the inner wall are preferably fused or glued together.

The inner wall may be curved or planar.

Preferably the sensing device includes at least one sender and/or receiver and the sender and/or receiver is connected to the inner wall.

In the inventive housing the window is formed by a hollow, air-tight window body. This measure prevents in a simple manner condensation on the window body so that the penetration of beams to and from the sensing device is not impeded. In this manner, a reliable function of the sensing device is ensured without requiring complicated devices in order to remove condensation from a steamed-up window.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
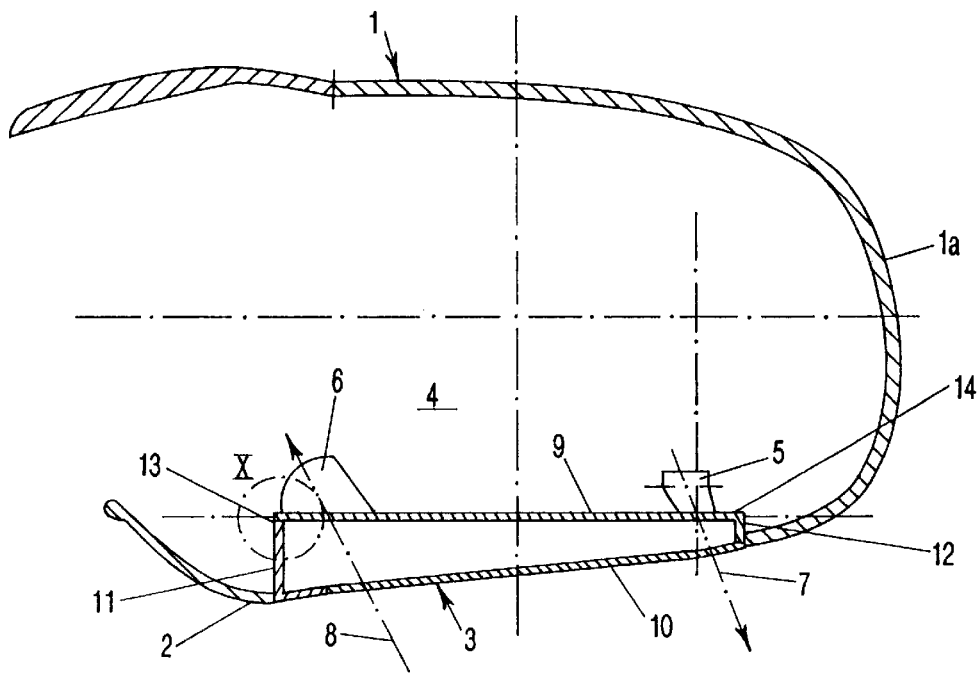
FIG. 1 shows a cross-section of the inventive housing.
Figure 1A:
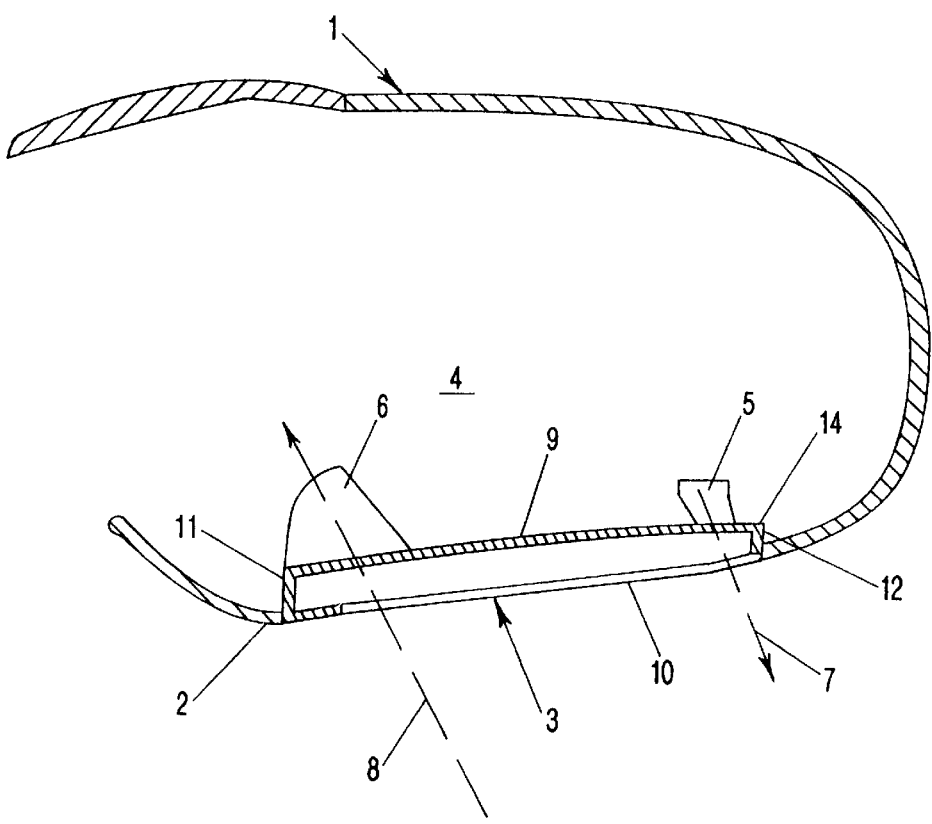
FIG. 1a shows a cross-section of the inventive housing with a curved inner wall.
Figure 2:
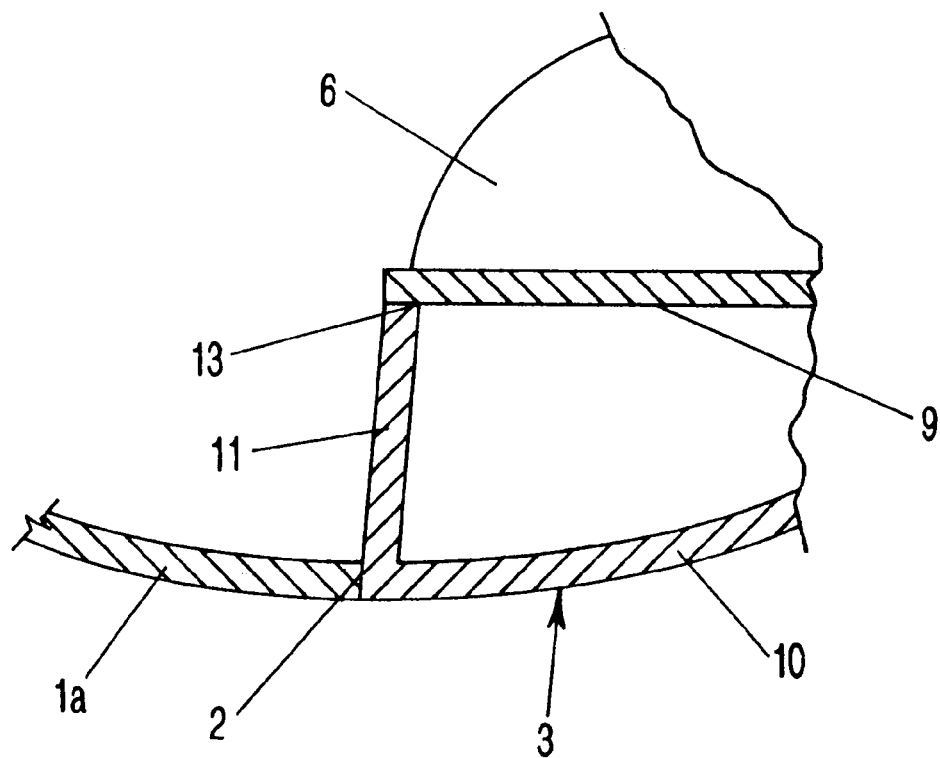
FIG. 2 shows a detail X of FIG. 1 in an enlarged representation.

The present invention will now be described in detail with the aid of several specific embodiments utilizing FIGS. 1 and 2.

The housing in the shown embodiment serves to receive a sensing device which is preferably an infrared sensing device. The sensing device can be used for detecting obstacles, for distance measuring, monitoring the space to the rear of the vehicle, detecting road surface markings, monitoring the surroundings, etc. The housing is advantageously the mirror head of an external rearview mirror of a vehicle, preferably a motor vehicle. It is, of course, possible to employ such a housing in addition to an exterior rearview mirror within the vehicle at a suitable location.

The housing has a hollow receiving body 1 which in the case of an exterior rearview mirror is part of the mirror head in which the support for the mirror pane is positioned so as to be adjustable in a manner known per se. The receiving body 1 may have any suitable shape. It is provided at least at one side with at least one opening 2 into which the window body 3 is inserted. Within the receiving body 1 a sensing device 4 is arranged which, in FIG. 1 is represented by a receiver 6 and a sender 5. The beams 7 emitted by the sender 5 exit through the window body 3 to the exterior. The beams 8 received by the receiver 6 penetrate the window body 3 and enter the receiving body 1. Advantageously, the sender 5 and/or the receiver 6 are fastened within the receiving body 1 at the inner wall 9 of the window body 3 positioned within the receiving body 1. The window body 3 is comprised of a material that is transparent to the beams 7 emitted by the sender 5.

The window body 3 is a hollow body which is sealed to be air-tight so that no moisture can penetrate into the interior of the window body 3. This ensures in a simple manner that no condensation will form on the outer wall 10 of the window body 3, and, in turn, ensures that the function of the sensing device 4 can not be impeded by condensation on the window.

The window body 3 is advantageously embodied such that the outer wall 10 is positioned within the wall member 1a of the receiving body 1 and, in the area of the opening 2, forms a continuous surface together with the wall member 1a of the receiving body 1. The window body 3 comprises a body member that is comprised of the outer wall 10 and unitarily attached sidewalls 11, 12 which extend, for example, parallel to one another. To the free edges 13 and 14 of the sidewalls 11 and 12 the inner wall 9 is fastened which can be planar or curved. The inner wall 9 can abut the edges 13, 14 and can be connected thereto by fusing or by gluing. The connecting location is designed such that air and/or moisture cannot enter the interior of the window body 3.

The window body 3 itself is sealingly connected in the opening 2 of the receiving body 1.

Since the sender 5 and the receiver 6 are directly fastened to the inner wall 9 of the window body 3, the emission and reception of beams 7, 8 is ensured in a reliable manner. The window body 3 eliminates the need for complicated additional devices for preventing con densation on the window body and the resulting impediment of the operation of the sensing device. The sender 5 and the receiver 6 are connected to a non-represented evaluation device which is provided within the receiving body 1 or within the vehicle. The evaluation device evaluates the signals received from the sensing device. The signals can be used for displaying different warning and/or auxiliary functions such as, for example, generating an optical and/or acoustical warning signal, correcting steering, correcting the vehicle speed etc.

The specification incorporates by reference the disclosure of German priority document 197 05 131.6 of Feb. 11, 1997.

The present invention is, of course, in no way restricted to the specific disclosure of the specification and drawings, but also encompasses any modifications within the scope of the appended claims.

What is claimed is:

1. A housing comprising:
   a receiving body for at least one optical sensing device;
   said receiving body having a receiving opening;
   at least one hollow and air-tight window body mounted in said receiving opening, wherein the at least one sensing device is mounted inside said receiving body behind said window body;
   said window body closed at all sides and transparent for beams emitted and received by the sensing device.

2. A housing according to claim 1, wherein said receiving body has a wall member, wherein said receiving opening is provided in said wall member, and wherein said window body is sealingly mounted in said receiving opening.

3. A housing according to claim 2, wherein said window body has an outer wall, and wherein said wall member and said outer wall together form a continuous outer surface.

4. A housing according to claim 3, wherein said window body has a body member, including said outer wall, and an inner wall connected air-tightly to said body member.

5. A housing according to claim 4, wherein said body member and said inner wall are fused together.

6. A housing according to claim 4, wherein said body member and said inner wall are glued together.

7. A housing according to claim 4, wherein said inner wall is curved.

8. A housing according to claim 4, wherein said inner wall is planar.

9. A housing according to claim 1, wherein the sensing device comprises at least one of a sender and a receiver, and wherein the at least one of the sender and the receiver is connected to said inner wall.

* * * * *